(12) United States Patent
Tsai

(10) Patent No.: US 12,450,185 B2
(45) Date of Patent: Oct. 21, 2025

(54) SWITCHING DEVICE APPLIED TO A DISPLAY AND METHOD OF SWITCHING WORKING MODES

(71) Applicant: QISDA CORPORATION, Taoyuan (TW)

(72) Inventor: Cheng-Hsiu Tsai, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 142 days.

(21) Appl. No.: 18/236,958

(22) Filed: Aug. 23, 2023

(65) Prior Publication Data

US 2024/0111698 A1    Apr. 4, 2024

(30) Foreign Application Priority Data

Sep. 30, 2022  (CN) .......................... 202211209735.6

(51) Int. Cl.
G06F 13/38 (2006.01)
G06F 13/40 (2006.01)
G10L 15/22 (2006.01)

(52) U.S. Cl.
CPC ........ G06F 13/385 (2013.01); G06F 13/4022 (2013.01); G10L 15/22 (2013.01); *G06F 2213/0042* (2013.01)

(58) Field of Classification Search
CPC .......................... G10L 15/22; G06F 2213/0042
See application file for complete search history.

(56) References Cited

U.S. PATENT DOCUMENTS

| 2004/0196833 | A1* | 10/2004 | Dahan | H04L 12/6418 |
| | | | | 370/352 |
| 2018/0143927 | A1* | 5/2018 | Kim | G06F 9/4415 |
| 2020/0098360 | A1* | 3/2020 | Nakamae | G10L 15/22 |

* cited by examiner

*Primary Examiner* — Henry Tsai
*Assistant Examiner* — Aurangzeb Hassan

(57) ABSTRACT

A switching device and a related method of switching working modes are applied to a display. The switching device includes a universal serial bus (USB) connector, a multiplexer, a USB hub and a controller. The USB connector is connected to a USB device or a voice control device. The multiplexer is electrically connected to the USB connector. The USB hub is electrically connected to the multiplexer and used to output a USB detection signal. The controller is electrically connected to the multiplexer and the USB hub, and used to output a reminder command. The controller determines whether the multiplexer actuates a USB channel for the USB connector or actuates a voice control channel for the voice control device in accordance with a response from at least one of the USB detection signal and the reminder command.

20 Claims, 5 Drawing Sheets

SWITCHING DEVICE APPLIED TO A DISPLAY AND METHOD OF SWITCHING WORKING MODES

BACKGROUND OF THE INVENTION

1. Field of the Invention

The present invention relates to a switching device and a method of switching working modes, and more particularly, to a switching device for economizing a number of connectors of a display and a related method of the switching working modes.

2. Description of the Prior Art

With the advanced technology, the display not only utilizes a remote control or physical buttons to provide a parameter adjustment function, but also has a voice control function; conventional skill inserts an external voice control device into a connector of the display to provide the voice control function, so that a voice control connector is disposed on the display for the external voice control device. However, the additional connector with a specific function increases difficulty of industrial design and manufacturing cost of the display. Therefore, design of a switching device applied to the display and allowing external devices with different functions to share one connector of the display is an important issue in the related display industry.

SUMMARY OF THE INVENTION

The present invention provides a switching device for economizing a number of connectors of a display and a related method of the switching working modes for solving above drawbacks.

According to the claimed invention, a switching device is applied to a display and includes a universal serial bus (USB) connector, a multiplexer, a USB hub and a controller. The USB connector is adapted to connect with a USB device or a voice control device. The multiplexer is electrically connected to the USB connector. The USB hub is electrically connected to the multiplexer and adapted to output a USB detection signal. The controller is electrically connected to the multiplexer and the USB hub, and adapted to output a reminder command. The controller determines whether the multiplexer actuates a USB channel for the USB connector or actuates a voice control channel for the voice control device in accordance with a response from at least one of the USB detection signal and the reminder command.

According to the claimed invention, a method of switching working modes is applied to a display with a universal serial bus (USB) connector, a multiplexer, a USB hub and a controller, for determining whether the display is connected with a USB device or a voice control device. The method includes the controller outputting a reminder command to the USB connector via the multiplexer, the controller receiving a USB detection signal from the USB hub, and the controller determining whether the multiplexer actuates a USB channel for the USB connector or actuates a voice control channel for the voice control device in accordance with a response from at least one of the USB detection signal and the reminder command.

The switching device and the method of switching the working modes of the present invention can automatically detect and output the signal for the voice control device when the voice control device is connected with the display, and further can automatically detect and output the signal for the USB device when the USB device is connected with the display. The display does not need to add an extra connector for the voice control device, and one USB connector can be arbitrarily applied for plugging the USB device or the voice control device into the display.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
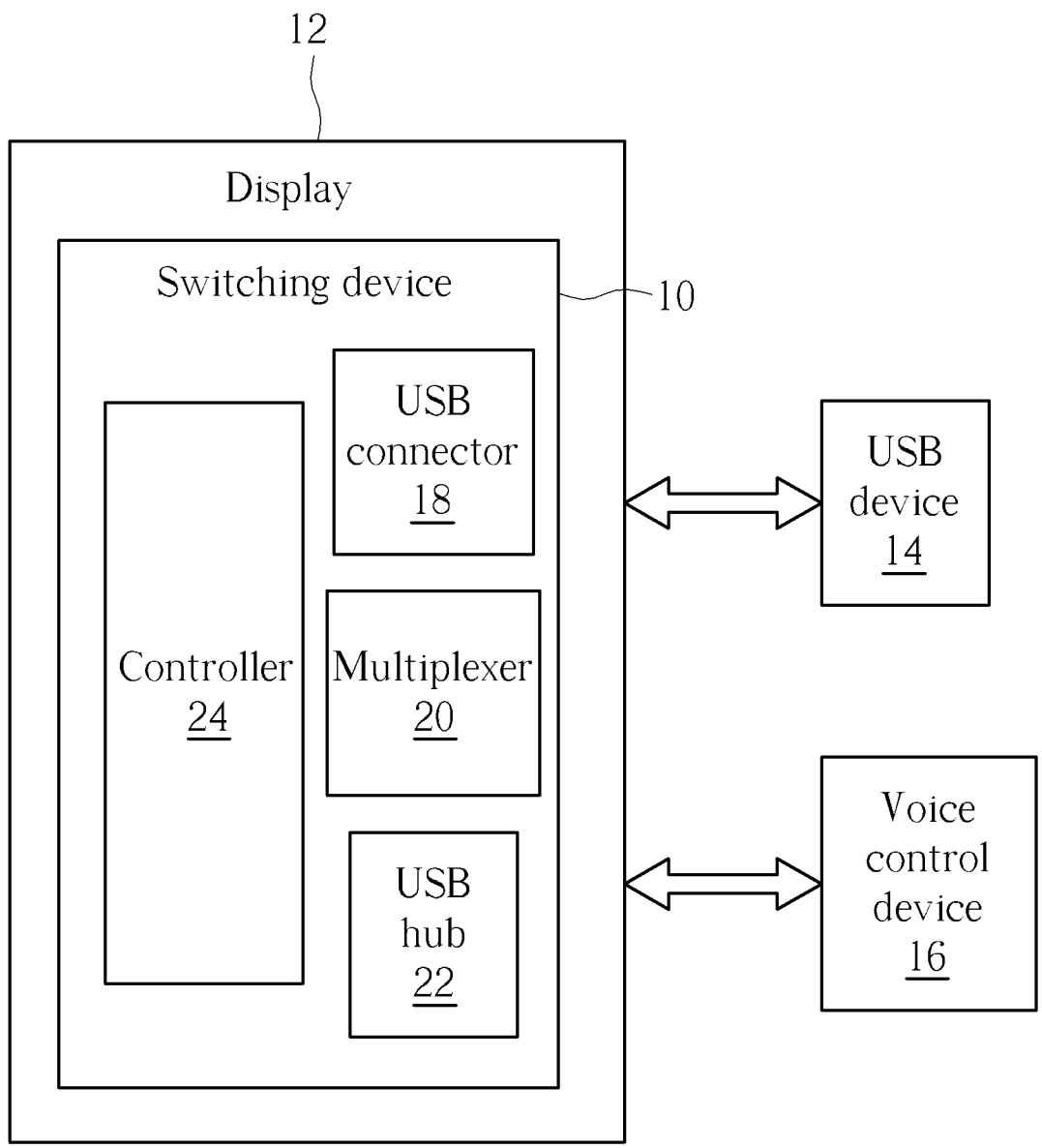
FIG. 1 is a functional block diagram of a switching device and a display according to an embodiment of the present invention.
Figure 2:
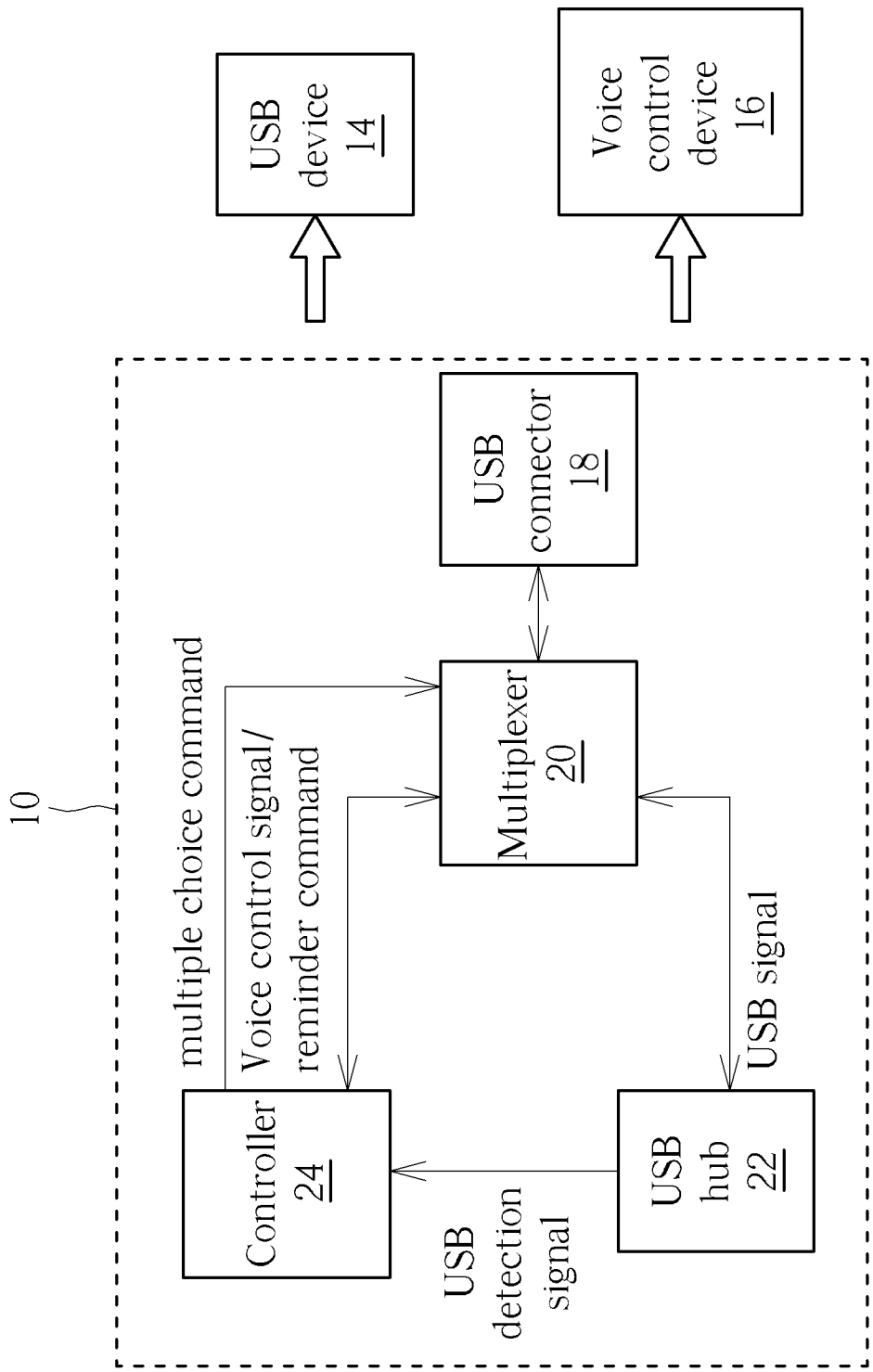
FIG. 2 is an architecture diagram of the switching device according to the embodiment of the present invention.

Please refer to FIG. 1 and FIG. 2. FIG. 1 is a functional block diagram of a switching device 10 and a display 12 according to an embodiment of the present invention. FIG. 2 is an architecture diagram of the switching device 10 according to the embodiment of the present invention. The display 12 can have a universal serial bus (USB) connector adapted to connect with a USB device 14 or a voice control device 16 in a detachable manner. The USB device 14 can be a common universal serial bus device for data transmission. The voice control device 16 can be any voice communication device conforming to the communications and video accessibility act (CVAA). The switching device 10 can be a built-in element or an independent element of the display 12. The present invention can utilize the switching device 10 to analyze a connection device and accordingly switch its working modes, so that the USB device 14 and the voice control device 16 can share the common serial bus connector of the display 12 via the switching device 10.

The switching device 10 can include a USB connector 18, a multiplexer 20, a USB hub 22 and a controller 24. The USB connector 18 can be connected with the USB device 14 or the voice control device 16 in accordance with an actual demand. The multiplexer 20 can be electrically connected to the USB connector 18, and used to switch a working mode into a USB channel for cooperating with the USB device 14, or into a voice control channel for cooperating with the voice control device 16. The USB hub 22 can output a USB detection signal USB_Detect used to detect whether the USB connector 18 is connected with the USB device 14. The controller 24 can output a reminder command cmd used to determine whether the USB connector 18 is connected with the voice control device 16. The reminder command cmd can be a command prompt applied for a universal asynchronous receiver/transmitter (UART), and an actual application of the reminder command is not limited to the above-mentioned embodiment.

Figure 3:
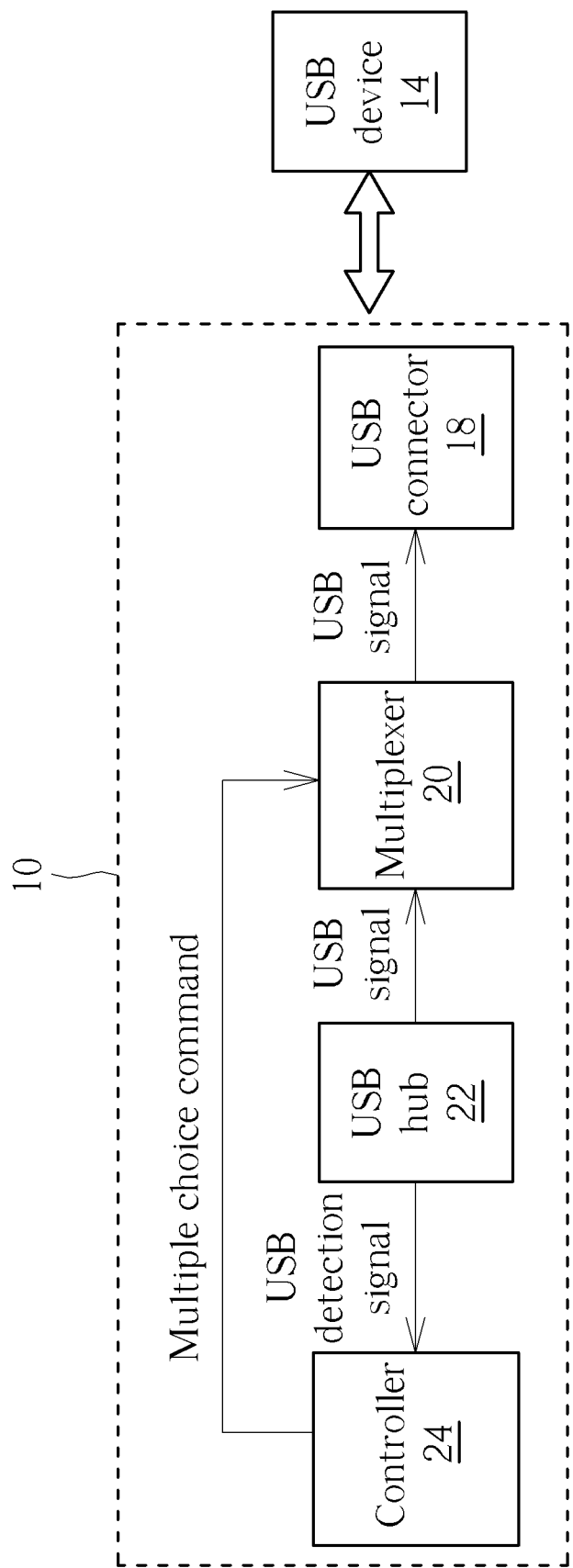
FIG. 3 is a diagram of the switching device switched in the USB channel according to the embodiment of the present invention.
Figure 4:
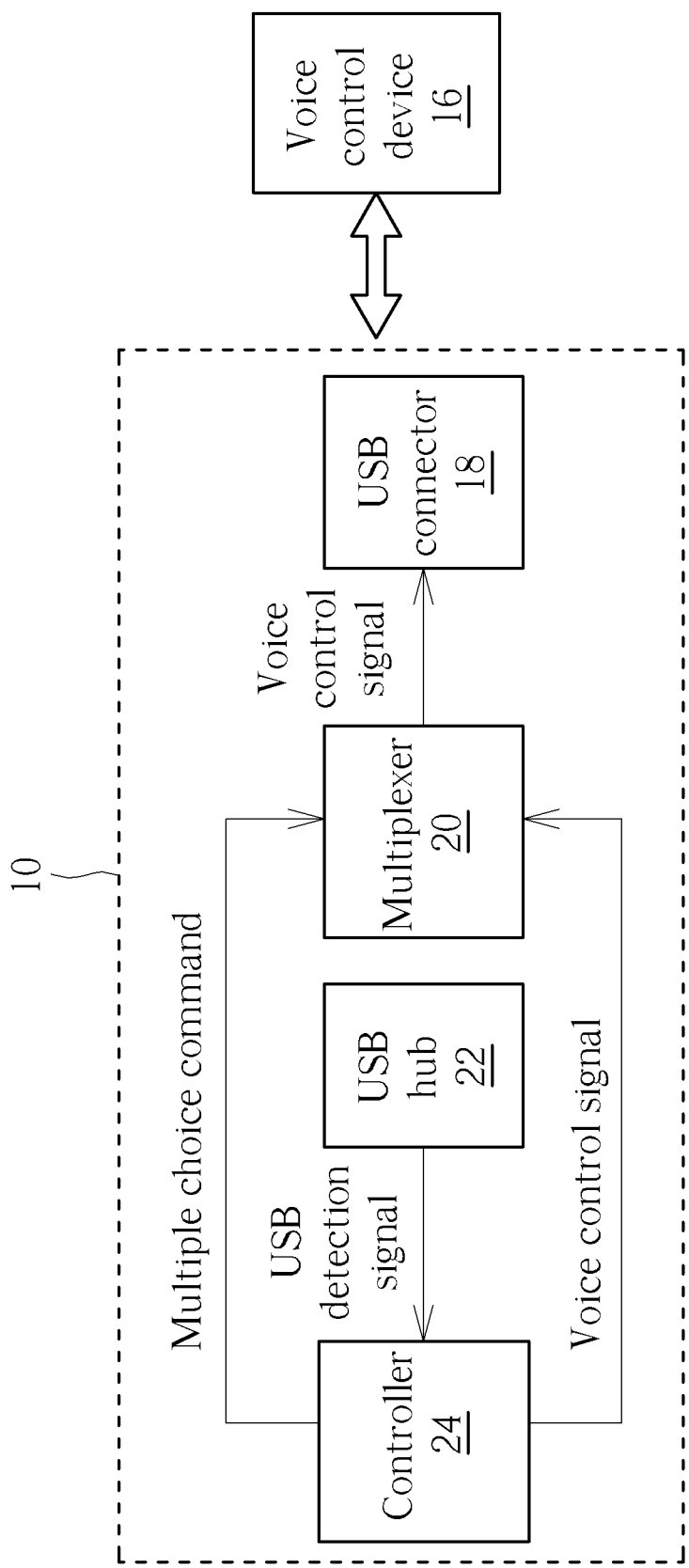
FIG. 4 is a diagram of the switching device switched in the voice control channel according to the embodiment of the present invention.
Figure 5:
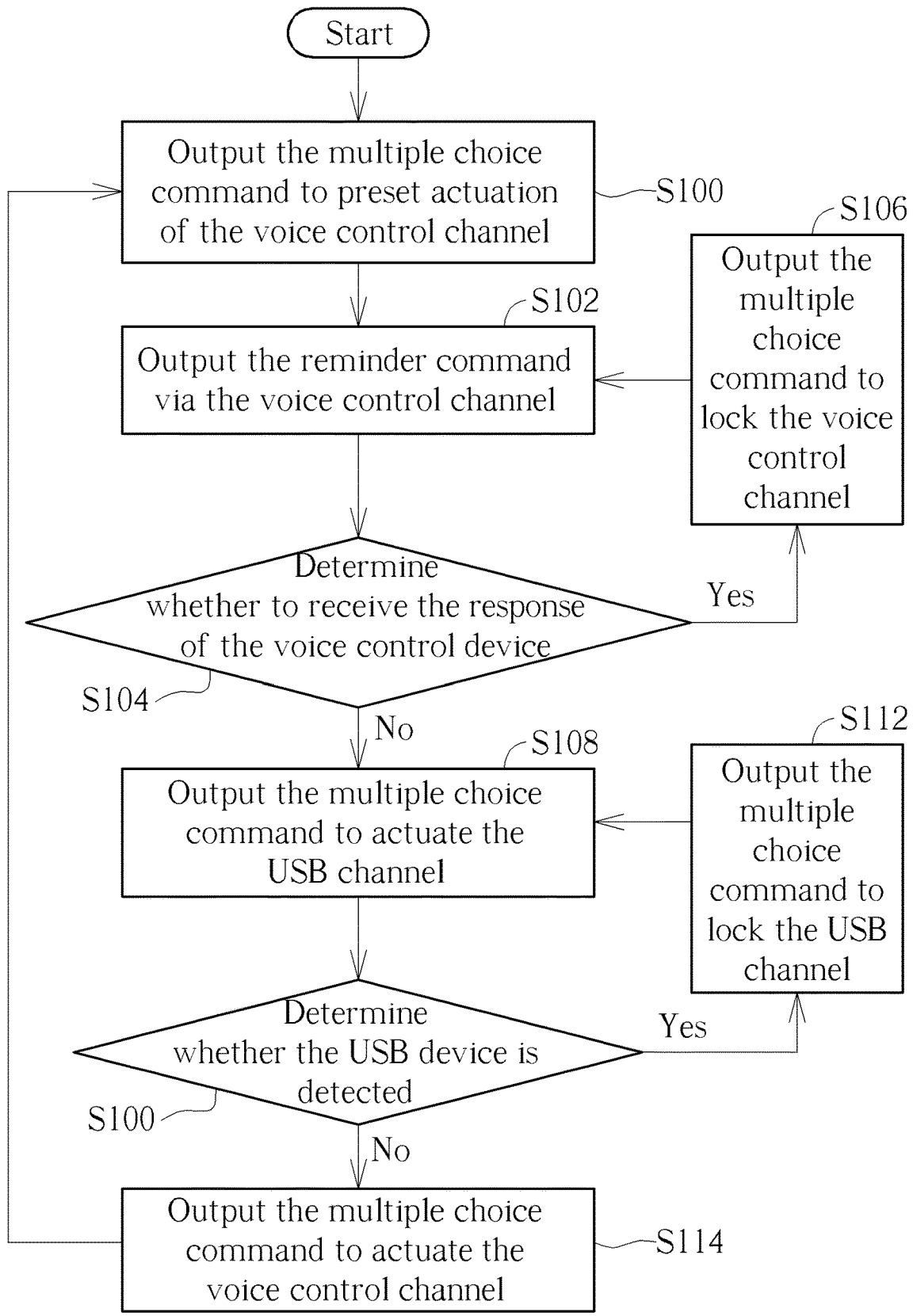
FIG. 5 is a flow chart of a method of switching the working modes according to the embodiment of the present invention.

Please refer to FIG. 3 to FIG. 5. FIG. 3 is a diagram of the switching device 10 switched in the USB channel according to the embodiment of the present invention. FIG. 4 is a diagram of the switching device 10 switched in the voice control channel according to the embodiment of the present invention. FIG. 5 is a flow chart of a method of switching the working modes according to the embodiment of the present invention. First, if an interface card of the display 12 is powered on, step S100 can be executed that the controller 24 can detect an external device, and output a multiple choice command MUX_Select to the multiplexer 20 and preset the voice control channel is actuated. Then, step S102 and step S104 can be executed that the controller 24 can output the reminder command cmd, and determine whether an action signal output by the voice control device 16 in accordance with the reminder command cmd is received, so as to utilize the multiplexer 20 to detect whether the voice control device 16 is connected with the USB connector 18.

If the voice control device 16 is connected with the USB connector 18, a response circuit of the voice control device 16 can output the action signal in accordance with the reminder command cmd, and then step S106 can be executed that the controller 24 can receive the action signal and output the multiple choice command MUX_Select to the multiplexer 20 for locking and actuating the voice control channel, so as to turn on the voice control device 16; meanwhile, a voice control signal VC_signal can be transmitted between the voice control device 16 and the controller 24 through the multiplexer 20 and the USB connector 18. The response circuit can be a text to speech (TTS) integrated circuit of the voice control device 16, which depends on the actual demand. In step S106, the controller 24 can preset a predefined period of time, and then confirm whether the action signal is received again in every predefined period of time, so as to determine whether to maintain the voice control channel.

If the voice control device 16 is not connected with the USB connector 18, the response circuit of the voice control device 16 does not output the action signal in accordance with the reminder command cmd. The controller 24 does not receive the action signal, and step S108 can be executed that the controller 24 can output the multiple choice command MUX_Select to shut down the voice control channel and further to actuate the USB channel. In step S108, the controller 24 does not receive the action signal from the voice control channel when the voice control device 16 is separated from the USB connector 18 or when the external device connected with the USB connector 18 does not belong to the voice control device 16, and therefore the multiplexer 20 can be automatically switched into the USB channel for next step.

Then, step S110 can be executed that the controller 24 can receive the USB detection signal USB_Detect output by the USB hub 22, and determine whether the USB device 14 can be detected after actuation of the USB channel. If the USB detection signal USB_Detect can detect the USB device 14, such as generating a high level detection value, step S112 can be executed to output the multiple choice command MUX_Select for locking the USB channel and ensure that connection of the USB device 14 is correct; meanwhile, the USB signal USB signal can be transmitted between the USB connector 18 and the controller 24 through the multiplexer 20 and the USB hub 22. In step S112, the controller 24 can confirm whether the USB detection signal USB_Detect is in a high level in each predefined period of time, for determining whether to maintain the USB channel.

If the USB detection signal USB_Detect does not detect the USB device 14, such as generating a low level detection value, the USB device 14 is not connected with the USB connector 18, and step S114 can be executed to output the multiple choice command MUX_Select to the multiplexer 20 for shutting down the USB channel and actuating the voice control channel; step S100 may be optionally executed after step S114. If the USB device 14 is separated from the USB connector 18, or the external device connected with the USB connector 18 does not belong to the USB device 14, the USB detection signal USB_Detect received by the controller 24 can belong to the low level detection value; therefore, the method of switching the working modes can be executed again to continuously detect the external device.

It should be mentioned that if the USB channel is preset in actuation when detecting the external device, the method of switching the working modes of the present invention can execute steps S108~S114 for a start, and then execute steps S100~S106, for driving the switching device 10 to detect the external device and automatically switch into the USB channel or the voice control channel. The USB device 14 and the voice control device 16 can share the common serial bus connector of the display 12 via the switching device 10 and the method of switching the working modes of the present invention.

In conclusion, the switching device and the method of switching the working modes of the present invention can automatically detect and output the signal for the voice control device when the voice control device is connected with the display, and further can automatically detect and output the signal for the USB device when the USB device is connected with the display. The display does not need to add an extra connector for the voice control device, and one USB connector can be arbitrarily applied for plugging the USB device or the voice control device into the display.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A switching device applied to a display, the switching device comprising:
   a universal serial bus (USB) connector adapted to connect with a USB device or a voice control device;
   a multiplexer electrically connected to the USB connector;
   a USB hub electrically connected to the multiplexer and adapted to output a USB detection signal; and
   a controller electrically connected to the multiplexer and the USB hub and adapted to output a reminder command, the controller presetting that the voice control device is actuated, and determining whether the multiplexer actuates a USB channel for the USB connector or locks a voice control channel for the actuated voice control device in accordance with a response from the reminder command.

2. The switching device of claim 1, wherein the controller acquires an action signal output by the voice control device in accordance with the reminder command, and output a multiple choice command to the multiplexer for actuating the voice control channel and further turning on the voice control device.

3. The switching device of claim 2, wherein the controller confirms whether the action signal is received in a predefined period of time, so as to determine whether to maintain the voice control channel.

4. The switching device of claim 1, wherein the controller determines that the USB detection signal does not detect the USB device, and outputs a multiple choice command to the multiplexer for actuating the voice control channel.

5. The switching device of claim 1, wherein the controller does not acquire an action signal output by the voice control device in accordance with the reminder command, and outputs a multiple choice command to the multiplexer for actuating the voice control channel.

6. The switching device of claim 5, wherein the controller determines that the USB detection signal detects the USB device, and outputs a multiple choice command to the multiplexer for locking the USB channel and ensuring connection of the USB device.

7. The switching device of claim 6, wherein the controller confirms whether the USB detection signal detects the USB device in a predefined period of time, so as to determine whether to maintain the USB channel.

8. The switching device of claim 5, wherein the controller determines that the USB detection signal does not detect the USB device, and outputs a multiple choice command to the multiplexer for switching to the voice control channel.

9. A method of switching working modes and applied to a display with a universal serial bus (USB) connector, a multiplexer, a USB hub and a controller, for determining whether the display is connected with a USB device or a voice control device, the method comprising:
the controller outputting a reminder command to the USB connector via the multiplexer;
the controller receiving a USB detection signal from the USB hub; and
the controller presetting that the voice control device is actuated, and determining whether the multiplexer actuates a USB channel for the USB connector or locks a voice control channel for the actuated voice control device in accordance with a response from the reminder command.

10. The method of claim 9, further comprising:
the controller presetting that the multiplexer actuates the voice control channel, and detecting an external device connected with the USB connector.

11. The method of claim 9, further comprising:
the controller determining whether an action signal output by the voice control device in accordance with the reminder command is acquired, and deciding whether to maintain the voice control channel in accordance with a determination result.

12. The method of claim 11, further comprising:
the controller outputting a multiple choice command to the multiplexer for locking the voice control device and turning on the voice control device when acquiring the action signal.

13. The method of claim 12, further comprising:
the controller confirming whether the action signal is received in a predefined period of time, so as to determine whether to maintain the voice control channel.

14. The method of claim 11, further comprising:
the controller outputting a multiple choice command to the multiplexer for shutting down the voice control channel and actuating the USB channel when not acquiring the action signal.

15. The method of claim 14, wherein the controller does not acquire the action signal when the voice control device is separated from the USB connector, or when an external device connected with the USB connector does not belong to the voice control device.

16. The method of claim 9, further comprising:
the controller outputting a multiple choice command to the multiplexer for locking the USB channel and ensuring connection of the USB device when determining that the USB detection signal detects the USB device.

17. The method of claim 16, further comprising:
the controller confirming whether the USB detection signal detects the USB device in a predefined period of time, so as to determine whether to maintain the USB channel.

18. The method of claim 9, further comprising:
the controller outputting a multiple choice command to the multiplexer for shutting down the USB channel and actuating the voice control channel when determining that the USB detection signal does not detect the USB device.

19. The method of claim 9, wherein the reminder command is a command prompt applied to a universal asynchronous receiver/transmitter (UART), and the voice control device is an external device conforming to communications and video accessibility act (CVAA).

20. The method of claim 9, wherein the voice control device comprises a text to speech (TTS) integrated circuit adapted to output an action signal in accordance with the reminder command.

* * * * *